Jan. 20, 1942.  H. T. WOOLSON ET AL  2,270,572
WHEEL SUSPENSION FOR MOTOR VEHICLES
Filed Nov. 2, 1938  3 Sheets-Sheet 2
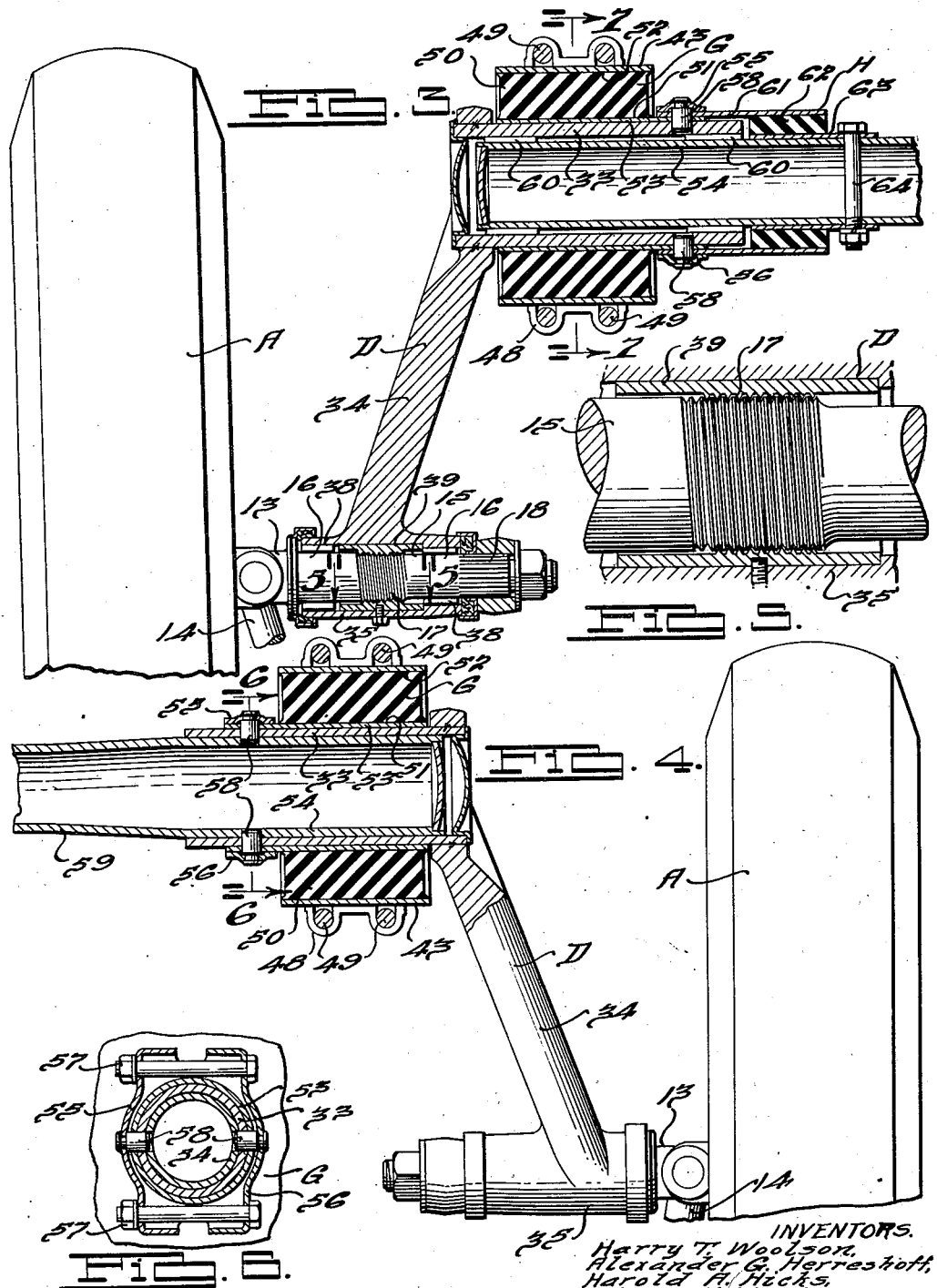

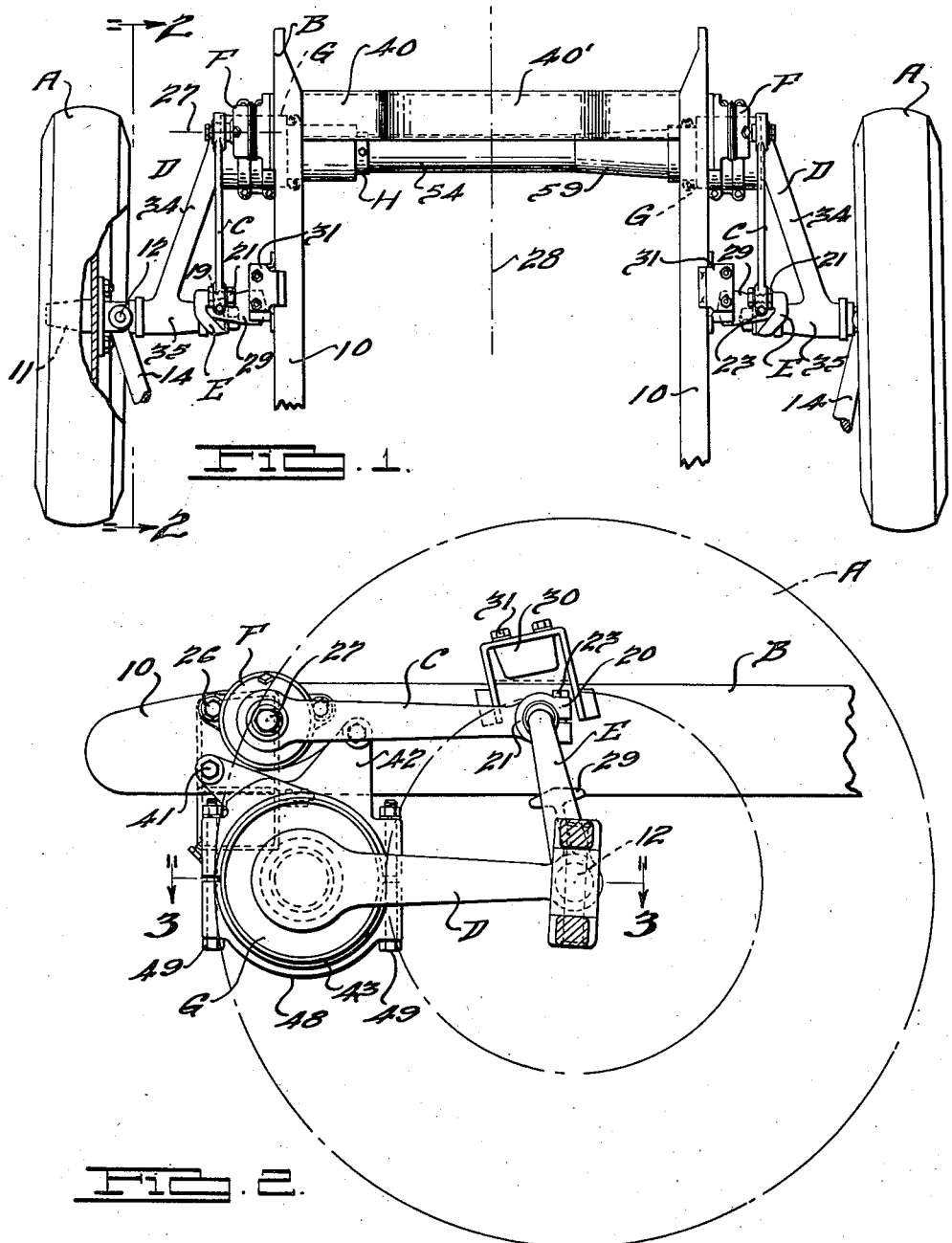

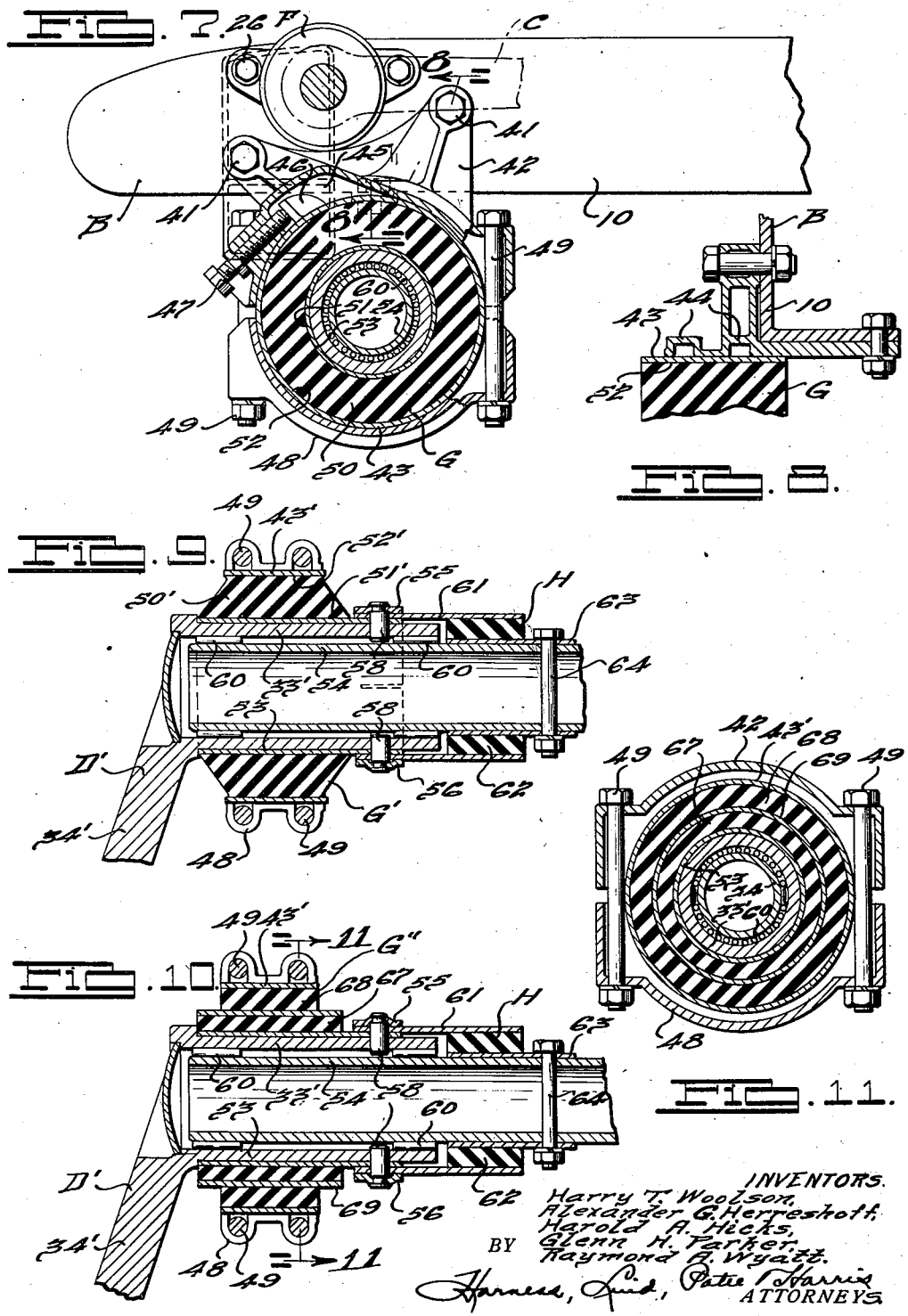

Patented Jan. 20, 1942

2,270,572

UNITED STATES PATENT OFFICE 2,270,572

WHEEL SUSPENSION FOR MOTOR VEHICLES

Harry T. Woolson, Detroit, Alexander G. Herreshoff, Grosse Pointe, Harold A. Hicks, Detroit, Glenn H. Parker, Royal Oak, and Raymond A. Wyatt, Detroit, Mich., assignors to Chrysler Corporation, Highland Park, Mich., a corporation of Delaware Application November 2, 1938, Serial No. 238,422

28 Claims. (Cl. 267—21)

This invention relates to motor vehicles and refers more particularly to improvements in wheel suspensions therefor.

One object of our invention is to provide a wheel suspension of the independently sprung type affording improved riding qualities, simplification in the operating parts and substantial reduction in the cost of manufacture and assembly.

A further object is to provide independent suspension for a pair of vehicle ground wheels incorporating a simplified and directly acting stabilizer or anti-sway device of improved form and arrangement for minimizing body roll and exercising a controlling action on the rising and falling movement of each of the ground wheels relatively to the other.

Another object of our invention is to provide an independent wheel suspension having improved stability and quietness of operation in controlling the forces acting between the ground wheels and the vehicle frame.

Further objects of our invention are to provide an independent wheel suspension comprising a parallelogram system of improved construction and operation.

Still further objects and advantages of our independently sprung wheel suspension over prior suspensions are: a material saving in weight, cost and reduction of unsprung weight; an arrangement of suspension and frame cross member which does not interfere with engine installation and which will permit of a shorter wheelbase vehicle with a decrease in weight; elimination of harshness and road noise by absorbing fore and aft as well as vertical shocks between the wheel and vehicle frame structure; an arrangement accommodating large wheel displacement before striking the limiting rubber bumpers; simplification of the frame side rails and front cross member; reduction in the number of pressure lubricators; and improved wheel geometry during wheel deflections decreasing tire wear.

In carrying out the objects of our invention we preferably provide an oscillatory wheel carrying arm structure for each of the wheels, this arm structure having a frame supported portion and a wheel carrying portion. The frame supported portion extends generally transversely of the vehicle and is connected to the frame through one or more annuli of deformable torsionally resisting material, such as rubber composition, thereby providing torsion springing units which support the frame and which yieldingly resist rising and falling movements of the associated wheels.

Each torsion unit preferably has its rubber annulus formed with concentric inner and outer cylindrical surfaces respectively connected with the frame supported arm portion and with the frame so that the annulus is torsionally stressed. The torsion units are also arranged to accommodate limited displacement of the arm structure in all directions to effectively dampen and absorb wheel shocks against transmission thereof to the vehicle frame structure.

The mounting for each wheel is also preferably arranged so that each frame supported arm portion is yieldingly supported at points widely spaced transversely of the frame structure to effectively brace the wheel against undesired lateral displacement.

Another object of our invention is to provide a simplified and improved arrangement of clamping or securing the torsion units with the frame structure and this arrangement may embody means for rotatably adjusting the outer surfaces of the rubber annuli relative to the inner surfaces for regulating the height of the frame from the ground by varying the torsional stress in the rubber annuli.

In order to add stability to the suspension, each oscillatory wheel carrying arm structure preferably has associated therewith a second frame pivoted arm and an upright member completing the parallelogram system.

An additional object of our invention is to provide a novel parallelogram suspension for steerable ground wheels and incorporating an improved arrangement for journalling an individual axle member on a parallelogram arm structure for efficient transmission of wheel loads and axial thrusts.

A further feature of our invention resides in the provision telescoped oscillatory elements each of which is connected to one of the wheels and bearing means journalling the telescoped portions of the elements as a unit. These oscillatory elements are supported on the frame through the torsion units such that the wheels may have independent rising and falling movement and limited displacement by conjoint movement of the oscillatory elements transversely to their common axis of oscillation. The aforesaid stabilizing connection furthermore provides for limited conjoint displacement of the oscillatory elements and the wheels connected thereto in a direction along the common axis of oscillation of these elements.

Additional features of our invention reside in the novel combination and arrangement of parts more particularly hereinafter described in detail and claimed, reference being had to the accompanying drawings in which:

Fig. 1 is a top plan view of the motor vehicle wheel suspension applied to the front steering ground wheels.

Fig. 2 is a sectional elevational view taken as indicated by line 2—2 of Fig. 1 and illustrating a typical wheel suspension as viewed from the side of the vehicle.

Fig. 3 is a sectional plan view taken as indicated by line 3—3 of Fig. 2 and showing one of the wheels together with its supporting arm and its mounting.

Fig. 4 is a similar view showing the other of the wheels together with its arm and mounting.

Fig. 5 is an enlarged detail view of the threaded thrust bearing at an individual axle on line 5—5 as shown in Fig. 3.

Fig. 6 is a detail sectional view taken as indicated by line 6—6 of Fig. 4 and showing the oscillating connection for one of the torsion units.

Fig. 7 is a sectional elevational view through one of the torsion units, the view being taken as indicated by line 7—7 of Fig. 3.

Fig. 8 is a detail sectional view taken as indicated by line 8—8 of Fig. 7.

Fig. 9 is a view generally corresponding to a portion of Fig. 3 but illustrating a modified construction of torsion unit.

Fig. 10 is a similar view illustrating a further modified torsion unit structure.

Fig. 11 is a sectional view of the Fig. 10 torsion unit taken as indicated by line 11—11 of Fig. 10.

Referring to the drawings, we have illustrated our wheel suspension system in connection with a pair of front steerable ground wheels A, each of which is adapted to be supported and guided for rising and falling movement independently of the remaining ground wheels of the vehicle. The vehicle frame structure B may be formed as a structural part of the body or may be in the nature of a chassis adapted to mount the body and comprises the pair of longitudinally extending channeled side members 10 for mounting the wheel supporting and guiding means.

Each of the wheels A is rotatable in the usual manner on a spindle 11 swivelly connected for steering movements by a king pin at 12 on a king pin receiving boss 13. Each spindle has a steering arm 14 for imparting steering movement to the associated wheel by any suitable type of steering mechanism.

The king pin boss 13 (Fig. 3) is carried at the outer end of an independent axle member 15 which has its axis extending inwardly as an extension of the axis of the associated spindle 11 when the ground wheels are positioned as in Fig. 1, each axle 15 therefore extending in a direction transversely of the frame structure B. Inasmuch as the mounting means for the wheels A are in many respects similar to each other, the description will, for the most part, be limited to the mounting for one of the wheels.

Intermediate the length of the axle member 15, the latter is formed with a pair of spaced cylindrical bearing portions 16 and a threaded portion 17 intermediate portions 16, the inner end of the axle being serrated at 18. The parallelogram system comprises upper and lower oscillating wheel carrying arm structures C and D respectively, each of these arm structures extending generally longitudinally of the vehicle and being adapted for pivotal support on the frame structure B at their forward ends. The rear ends of the arm structures C and D are pivotally connected by an upright member E which preferably extends upwardly from the arm structure D.

The upright member E has its lower end engaged with the serrations 18 of the axle member 15 so that this upright member is fixed against movement with respect to the axle member. The upright member has its upper end portion return-bent and terminates in an inwardly extending threaded shank 19 positioned generally above the lower end of the upright member. The rear end of the upper arm structure C has a yoked terminal 20 adapted to receive a bushing 21 formed with internal threads pivotally engaging the threads of shank 19. A fastener 23 extends through the yoke portions of arm C and is adapted to hold the bushing 21 in position with respect to arm C.

The forward end of arm structure C is pivotally supported by the frame structure through the intermediary of a hydraulic shock absorber F of any suitable well known "rotary type". The body portion of the shock absorber is secured by fastener 26 to the frame side member 10. The pivotal support thus formed accommodates oscillation of the arm structure C about an axis 27 which extends generally transversely of the frame structure B and in this instance perpendicular to the vertical longitudinal mid-plane 28 of the motor vehicle.

In order to limit upward movement of the wheel A relative to the frame structure B, the upright member E carries an inwardly projecting abutment 29 adapted to strike a rubber bumper 30 carried by the supporting bracket 31 which is secured to the side member 10.

Each arm structure D is shown as a build-up construction comprising an oscillatory tubular frame supported portion or element 33 which extends generally transversely of the frame structure B and in this instance has its axis perpendicular to the aforesaid plane 28. Each arm structure D is also formed with a wheel connecting portion 34 which is welded to the portion 33 and which extends longitudinally of the frame structure and laterally outwardly therefrom, thus forming a crank-like portion offset rearwardly from the frame supported portion 33 and terminating in an end portion 35 which is hollow and cylindrical.

The arm structure D is adapted to take the vertical loads as well as the lateral loads acting between wheel A and frame structure B, leaving the arm structure C to function chiefly as a guide member for the axle 15 in maintaining the caster angle of the king pin 12 constant during rising and falling movement of the ground wheel A. The arm structure C also functions to take the brake thrust of the associated ground wheel, as will be readily apparent.

The cylindrical portion 35 rotatably journals the associated axle member 15 by bearings 38, preferably of the anti-friction roller type at the bearing portions 16. A thrust bearing is formed by engagement of the threads 17 with the internal threads of a bushing 39 which is suitably fixed to arm portion 35 thereby forming a structural part of the arm structure D. As best shown in Fig. 5 sufficient clearance is provided between the interengaged threads so that the threads engage for thrust transmission only when axle member 15 is subjected to axial thrust in either direction, the bearings 38 readily accommodating the slight axial movement of axle member 15 in taking up the thread clearance. Thus the vertical loads are entirely transmitted by bearings 38 and axial thrusts are transmitted through threads 17 without thrusting bearings 38. In Fig. 5 the axle member 15 is illustrated as free from end thrust in either direction, the clearance at threads 17 being divided at each side of the threads.

We have provided a suspension system wherein each arm structure D has its oscillation resisted by a torsionally acting supporting unit, each being preferably formed of a body of yielding deformable material and so arranged as to "float" the arm structure to yieldingly resist displacement thereof in directions both axially of the frame supported portion as well as transversely of this axis of oscillation for the arm structure D. In the present instance we have so arranged the torsion units in association with each arm structure D as to provide a high degree of stability for each wheel A thereby preventing undesired displacements of the wheel while at the same time effectively dampening shocks and vibrations which tend to produce harshness between the ground wheel and frame structure.

In the present instance each arm has associated therewith a torsion unit G supported at a side frame member 10 and arranged to yieldingly resist oscillation of an associated arm structure D about the axis of the arm portion 33 as well as movement thereof in the direction along and transversely of the axis of oscillation. The units G furthermore support the load of the frame structure on the ground wheels A and thereby provide for springing the motor vehicle on the wheels in lieu of more conventional systems employing coil or leaf types of load supporting springs.

In order to laterally brace the side members 10 and to strengthen the frame structure at the regions of support for the arm structures C and D, we have provided a transversely extending hollow front cross member 40 for the frame structure B, this cross member being of boxed-in construction with the central region depressed at 40' and being welded in position where the outer ends of the cross member intersect the respective side members 10. In order to mount each of the torsion units G on the frame structure B, each side rail 10 has secured thereto by fasteners 41 a clamping bracket member 42 arched to provide a cavity for seating the outer cylindrical sleeve 43 of the torsion unit. This bracket 42 has arched strengthening ribs 44 intermediate which is a pocket 45 into which an abutment lug 46 projects, the lug being welded to sleeve 42. A screw 47 is adjustably carried by bracket 42 and engages lug 46 to effect rotative adjustment of sleeve 43 in order to vary the torsional setting of unit G as will presently be more apparent.

Associated with bracket 42 there is a companion ribbed clamping member 48 arched to seat sleeve 43, the members 42 and 48 together embracing this sleeve and holding the same fixed to the frame structure when the clamping members are relatively clamped together by the fastener assemblies 49.

Each unit G comprises an annular cylindrical body of resilient deformable non-metallic material 50 preferably of rubber composition having its inner and outer cylindrical surfaces 51 and 52 respectively secured as by vulcanizing with an inner cylindrical sleeve 53 and with the outer concentric sleeve 42. The rubber body 50 is preferably molded under high pressure and heat to form the assembled unit G.

Referring to Fig. 4 showing the right hand wheel, the sleeve 53 projects inwardly beyond sleeve 43 and rubber body 50 for connection with the oscillatory tubular element 33 and with a further oscillatory tubular element 54 by reason of the clamping connecting means illustrated in Fig. 6. The tube 54 has an end portion fitting within the tube 33 and forms a structural extension of the latter.

Surrounding the inner end portion of sleeve 53 and fitted thereto are the companion ribbed clamping members 55 and 56 urged together in assembled relationship by the fastener assembly 57, each clamping member carrying a lug 58 extending inwardly therefrom through aligned openings in the parts 53, 33 and 54 thereby locking these parts together against any relative movement and insuring their oscillation as a unit.

Tube 54 is slightly reduced in diameter at 59 and extends across the frame structure B beneath the opposite side rails 10 and has its opposite ends extending through the respective torsion units G in telescoping relationship with the parts 51, 53 and 33 associated with each torsion unit. Fig. 3 shows the opposite end of tube 54 telescoping within tubular element 33 and rotatably journalled therein by suitable bearing means preferably of the anti-friction type at 60.

Clamping members 55 and 56 similar to those aforesaid serve to assemble parts 53 and 33 (Fig. 3) as a unitary assembly against any relative movement, this assembly further including an outer sleeve 61 which telescopes the inner end of tubular element 33 and extends therebeyond concentrically around the tube 59 for purposes presently to be described.

It will be apparent that each body 50 will torsionally resist oscillation of an associated arm D in supporting the load of frame on a ground wheel A and also in yieldingly resisting rising and falling movement of the ground wheel with respect to the frame. Displacements of each arm portion 33 in the direction of their common axis of oscillation as well as transversely thereto will also be yieldingly resisted by the associated rubber body 50 acting in longitudinal shear for displacement of an arm portion 33 in the direction of its axis and in tension and compression when arm portion 33 tends to be displaced transversely to its axis.

Further, by reason of the Fig. 3 arm structure D being journalled on the Fig. 4 arm structure D by the tubular transverse extension 54 of the latter arm structure, these two wheel carrying arm structures are constrained for conjoint displacement in directions transversely to the common axis of oscillation of tubular parts 33, the two arm assemblies being "floated" by the supporting units G each of which cooperates with the other to yieldingly resist such displacement of either of the arms and its associated wheel A. This arrangement lends great stability to the suspension system as the units G are widely separated so as to most effectively control the thrusts of the ground wheels tending to rock each arm structure D about its associated unit G as a fulcrum in such a manner that the tubular part 33 tends to tilt or to be displaced in a fore and aft direction.

In order to regulate the initial setting of each torsion unit G and thereby regulate the amount of relative movement of the frame structure and ground wheel under normal loaded conditions, the adjusting means at the screw 47 may be utilized after loosening assemblies 49 to rotatably adjust the outer sleeve 43 with respect to the inner sleeve 53 thereby either elevating or lowering the front end of the frame structure B with respect to the ground wheels A.

We have also provided an improved and simplified means acting as a stabilizer or sway-eliminator which yieldingly resists relative rotation of the two arm portions 33 resulting, among other things, in keeping the frame structure and vehicle body on an even keel especially when the vehicle is rounding a curve. The stabilizer furthermore has a controlling influence on the two steering ground wheels when these wheels have relative vertical displacements although when the wheels rise and fall together, the stabilizer does not have any controlling function between the wheels. In addition, the stabilizer connects the two arm structures D in such a manner as to yieldingly constrain the arm portions 33 for conjoint displacement in opposite directions along their common axis of oscillation whereby each of the rubber bodies 50 serves to some extent to resist such displacement when either of the ground wheels A is subjected to lateral thrust.

The stabilizer means is generally designated at H and comprises a cylindrical sleeve or body 62 of deformable torsionally resisting non-metallic material such as rubber composition, the outer cylindrical surface of which is bonded by vulcanization with the inner surface of the aforesaid sleeve 61 and whose inner concentric cylindrical surface is bonded to another sleeve 63 fixed with tube 54 by the bolt assembly 64. The inner sleeve 63 extends inwardly beyond the body 62 to accommodate fastener 64 just as the outer sleeve 61 extends outwardly beyond body 62 for attachment to tubular part 33 by the clamping members 55, 56 and their associated lugs 55.

In the operation of the wheel suspension it will be apparent that each ground wheel A is arranged for steering about its king pin at 12, the parallelogram system accommodating rising and falling movement of each ground wheel relative to the remaining wheels of the vehicle, the associated arm structure D taking the vertical loads as well as the lateral loads acting between the associated ground wheel A and the frame structure B while the arm structure C, in conjunction with the upright member E, takes the brake reaction at the associated ground wheel and also maintains the wheel caster angle at king pin 12 constant.

Rising and falling movement of a ground wheel A is yieldingly resisted by its associated torsion unit G, the shock absorber F acting to control relative displacement of the ground wheel with respect to the frame structure. The rubber body 50 of each unit G torsionally resists oscillations of arm portion 33 and sustains the weight of the frame on the associated wheel. The two rubber bodies also serve to suspend each wheel and its arm structure D in a yielding manner so as to resist displacement of this arm while preventing the transmission of shocks and vibrations between the ground wheel and frame.

The stabilizing means J serves to control relative displacements of the ground wheels A and to maintain the frame structure and body on a substantially even keel when rounding a curve, and at other times. Lateral thrusts on a ground wheel A tend to fulcrum the associated wheel-carrying arm structure D about its unit G, undesired displacement being resisted by the other unit G, the units being spaced sufficiently to provide the desired stability to the wheel suspension.

Referring now to Fig. 9 we have illustrated a slightly modified arrangement of certain parts which may be substituted for corresponding parts in the previous embodiment. The differences in Fig. 9 reside primarily in making the oscillatory wheel carrying lower arm structure D' unitary as to the portions 33' and 34' which otherwise are identical with the corresponding portions 33 and 34 of arm D. Also, the rubber body 50' of unit G' now has its end faces 65 and 66 converging outwardly so as to minimize the quantity of rubber used and to more nearly render the torsional stresses uniform throughout the body and particularly at the inner and outer surfaces 51' and 52' respectively, surface 51' now being longer than surface 52' and outer sleeve 43'. The remaining parts are identical with the Fig. 3 unit G, it being understood that in substituting unit G' both units would preferably be of the same construction.

In the modified arrangement shown in Figs. 10 and 11, we have illustrated a further modification for the torsion units one of which is illustrated. In this embodiment the inner sleeve 53 of unit G'' has bonded thereto a cylindrical rubber body 67 surrounding which is a shorter cylindrical rubber body 68 with an intermediate cylindrical sleeve 69 bonded to both bodies. The outer sleeve 43' is bonded to body 68. This type of torsion unit provides substantially uniform and favorable distribution of stresses throughout the rubber and at the inner and outer sleeves 53 and 43'.

In operation the units G' and G'' function just as described in connection with the units G in the principal embodiment of Figs. 1 to 8 and the modified types may be substituted therein if desired.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a body of deformable material for mounting each of said supporting portions on said frame structure for yieldingly resisting oscillation of each supporting portion about a common axis extending generally transversely of said frame structure, a pair of oscillatory members respectively fixed for oscillatory movement with said frame supported portions of said arm structures, and a body of deformable material bonded to said pair of oscillatory members so as to connect the supporting portions of said oscillatory arm structures to yieldingly resist relative oscillation thereof, said members and body being so constructed and arranged as to place said body under torsional stress between said members in response to said relative oscillation of said frame supported portions.

2. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a rigid frame supported portion extending generally transversely of said frame structure, means comprising a body of deformable material for mounting each of said rigid supported portions on said frame structure for yieldingly resisting oscillation of each supported portion about a common axis extending generally transversely of said frame structure, and stabilizer means including a resilient non-metallic torsionally stressed body having relatively movable portions thereof respectively fixed to the rigid supported portions of said oscillatory arm structures.

3. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, and stabilizer means including an annular body of deformable material surrounding said axis and having relatively movable portions thereof respectively fixed to the supported portions of said oscillatory arm structures.

4. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, and stabilizer means including an annular body of deformable material surrounding said axis and having relatively movable inner and outer cylindrical surface portions thereof respectively fixed to the supported portions of said oscillatory arm structures.

5. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported rigid tubular portion extending generally transversely of said frame structure, means for mounting each of said tubular portions on said frame structure for oscillation about a common axis extending generally transversely of said frame structure, and stabilizer means comprising a resilient non-metallic body having relatively movable portions thereof respectively fixed for oscillatory movement with the supported portions of said oscillatory arm structures.

6. In a motor vehicle having a frame structure and a pair of road wheels disposed at opposite sides thereof, a pair of rigid oscillatory elements respectively connected to said wheels, means for mounting said elements for oscillation about a common axis, and a resilient non-metallic torsionally active body having relatively movable portions thereof respectively fixed for oscillatory movement with said rigid oscillatory elements.

7. In a motor vehicle having a frame structure and a pair of road wheels disposed at opposite sides thereof, a pair of oscillatory elements respectively connected to said wheels, means for mounting said elements for oscillation about a common axis, and an annular body of resilient material having its inner and outer surface portions respectively fixed for movement with said oscillatory elements.

8. In a motor vehicle having a frame structure and a pair of road wheels disposed at opposite sides thereof, a pair of relatively telescoped rigid oscillatory elements respectively connected to said wheels for oscillation about a common axis, and a resilient torsionally active non-metallic body having relatively movable portions thereof respectively fixed for movement with said oscillatory elements.

9. In a motor vehicle having a frame structure and a pair of road wheels disposed at opposite sides thereof, a pair of telescoped tubular elements respectively connected to said wheels for oscillation about a common axis, and an annular body of resilient material having its inner and outer surface portions respectively fixed for movement with said elements.

10. In a motor vehicle having a frame structure and a pair of road wheels disposed at opposite sides thereof, a pair of oscillatory elements respectively connected to said wheels, means for mounting said elements for oscillation about a common axis, a pair of oscillatory members respectively fixed for movement with said elements, and a body of resilient non-metallic material having relatively movable portions thereof respectively bonded to said members.

11. In a motor vehicle having a frame structure and a pair of road wheels disposed at opposite sides thereof, a pair of oscillatory elements respectively connected to said wheels, means for mounting said elements for oscillation about a common axis, a pair of telescoped sleeves respectively fixed for movement with said elements, and an annular resilient body having its inner and outer surface portions respectively fixed to said sleeves.

12. In a motor vehicle having a frame structure and a pair of road wheels disposed at opposite sides thereof, a pair of telescoped tubular elements respectively connected to said wheels for oscillation about a common axis, a pair of telescoped sleeves respectively fixed for movement with said tubular elements, and an annular resilient body having its inner and outer surface portions respectively fixed to said sleeves.

13. In a motor vehicle having a frame structure and a pair of road wheels disposed at opposite sides thereof, a pair of oscillatory elements respectively connected to said wheels for oscillation about a common axis, a torsion rubber spring operably connected between the frame structure and each of said elements, said elements having telescoped portions thereof such that one of said portions lies within the spring to which the other of said elements is operably connected, and means journalling one of said telescoped portions within the other.

14. In a motor vehicle having a frame structure and a pair of road wheels disposed at opposite sides thereof, a pair of oscillatory elements respectively connected to said wheels for oscillation about a common axis, said elements having telescoped portions thereof, means journalling one of said telescoped portions within the other, and a resilient body having relatively movable portions thereof respectively fixed for movement with said oscillatory elements.

15. In a motor vehicle having a frame structure and a pair of road wheels disposed at opposite sides thereof, a pair of oscillatory elements respectively connected to said wheels for oscillation about a common axis, said elements having telescoped portions thereof, means journalling one of said telescoped portions within the other, and means yieldingly mounting each of said elements on said frame structure for oscillation relative to the other of said elements.

16. In a motor vehicle having a frame structure and a pair of road wheels disposed at opposite sides thereof, a pair of oscillatory elements respectively connected to said wheels for oscillation about a common axis, said elements having telescoped portions thereof, means journalling one of said telescoped portions within the other, and means yieldingly mounting each of said elements on said frame structure for oscillation relative to the other of said elements, each of said mounting means comprising a deformable torsionally elastic non-metallic body having portions thereof respectively fixed with respect to said frame structure and the element mounted thereby.

17. In a motor vehicle having a frame structure and a pair of road wheels disposed at opposite sides thereof, a pair of tubular elements respectively connected to said wheels for oscillation about a common axis extending transversely of the vehicle, one of said tubular elements extending from approximately one side of said frame structure toward the other side but terminating appreciably short thereof, the other of said tubular elements being relatively longer than the first said tubular element and extending from approximately said other side of the frame structure and reaching substantially across the frame structure into telescoping relationship with the first said tubular element, means supporting said tubular elements for oscillation on said frame structure, and bearing means between the telescoped portions of said tubular elements.

18. In a motor vehicle having a pair of road wheels disposed at opposite sides thereof, a pair of oscillatory elements respectively connected to said wheels and arranged for oscillatory movement independently of each other about a common axis extending transversely of the vehicle, means for journalling one of said elements on the other to prevent their relative displacement in a direction transversely of said axis, and means yieldingly mounting said elements on the vehicle accommodating relative oscillation of said elements about said axis and limited conjoint displacement thereof transversely of said axis.

19. In a motor vehicle having a pair of road wheels disposed at opposite sides thereof, a pair of oscillatory elements respectively connected to said wheels and arranged for oscillatory movement independently of each other about a common axis extending transversely of the vehicle, means for journalling one of said elements on the other to prevent their relative displacement in a direction transversely of said axis, and means yieldingly mounting said elements on the vehicle accommodating relative oscillation of said elements about said axis and limited conjoint displacement thereof transversely of said axis, said mounting means comprising a pair of non-metallic bodies of torsionally elastic material, each of said bodies having relatively movable portions thereof respectively connected to the vehicle and to one of said elements for torsionally resisting oscillation of the element connected thereto.

20. In a motor vehicle having a pair of road wheels disposed at opposite sides thereof, a pair of oscillatory elements respectively connected to said wheels and arranged for oscillatory movement independently of each other about a common axis extending transversely of the vehicle, means for journalling one of said elements on the other to prevent their relative displacement in a direction transversely of said axis, means yieldingly mounting said elements on the vehicle accommodating relative oscillation of said elements about said axis and limited conjoint displacement thereof transversely of said axis, and stabilizer means including a resilient non-metallic body having relatively movable portions thereof respectively connected to said elements.

21. In a motor vehicle having a pair of road wheels disposed at opposite sides thereof, a pair of oscillatory elements respectively connected to said wheels and arranged for oscillatory movement independently of each other about a common axis extending transversely of the vehicle, means for journalling one of said elements on the other to prevent their relative displacement in a direction transversely of said axis, means yieldingly mounting said elements on the vehicle accommodating relative oscillation of said elements about said axis and limited conjoint displacement thereof transversely of said axis, said mounting means comprising a pair of non-metallic bodies of torsionally elastic material, each of said bodies having relatively movable portions thereof respectively connected to the vehicle and to one of said elements for torsionally resisting oscillation of the element connected thereto, and stabilizer means including an annular body of deformable material surrounding said axis and having relatively movable portions thereof respectively connected to said elements.

22. In a motor vehicle having a pair of road wheels disposed at opposite sides thereof, a pair of rigid oscillatory elements respectively connected to said wheels and arranged for oscillatory movement independently of each other about a common axis extending transversely of the vehicle, means yieldingly mounting said elements on the vehicle accommodating oscillation of said elements relatively to each other and conjoint displacement of said elements transversely of and in opposite directions along said axis, and means connecting said elements to effect their said conjoint displacement.

23. In a motor vehicle having a pair of road wheels disposed at opposite sides thereof, a pair of oscillatory elements respectively connected to said wheels and arranged for oscillatory movement independently of each other about a common axis extending transversely of the vehicle, means yieldingly mounting said elements on the vehicle accommodating oscillation of said elements relatively to each other and conjoint displacement of said elements transversely of and in opposite directions along said axis, means for journalling one of said elements on the other to effect their said conjoint displacement transversely of said axis, and means yieldingly connecting said elements to effect their said conjoint displacement in opposite directions along said axis.

24. In a motor vehicle having a pair of road wheels disposed at opposite sides thereof, a pair of oscillatory elements respectively connected to said wheels and arranged for oscillatory movement independently of each other about a common axis extending transversely of the vehicle, means yieldingly mounting said elements on the vehicle accommodating oscillation of said elements relatively to each other, said mounting means comprising a pair of annular non-metallic bodies of torsionally elastic material, each of said bodies having relatively movable portions thereof respectively connected to the vehicle and to one of said elements for torsionally resisting oscillation of the element connected thereto, said elements having portions thereof telescoped within one of said annular bodies, and means journalling one of said telescoped portions on the other.

25. In a motor vehicle having a pair of road wheels disposed at opposite sides thereof, a pair of oscillatory elements respectively connected to said wheels and arranged for oscillatory movement independently of each other about a common axis extending transversely of the vehicle, means yieldingly mounting said elements on the vehicle accommodating oscillation of said elements relatively to each other, said mounting means comprising a pair of annular non-metallic bodies of torsionally elastic material, each of said annular bodies having a pair of relatively movable attaching members bonded thereto and respectively adapted for attachment to the vehicle and to one of said elements, each of said bodies being torsionally stressed in response to oscillation of the element attached thereto, a non-metallic body of yielding material having a pair of attaching members bonded thereto and respectively adapted for attachment to said elements, and common means for attaching one of the first said attaching members and one of the second said attaching members to one of said elements.

26. In a motor vehicle having a road wheel disposed at one side thereof, an oscillatory element connected to said wheel for oscillatory movement in response to rising and falling movement of the wheel independently of the remaining wheels of the vehicle, a non-metallic body of elastic material having a pair of relatively movable attaching members bonded thereto, one of said attaching members having a lug projecting therefrom and the other being connected for movement with said oscillatory element, a clamping member for connecting the lug-carrying attaching members to the vehicle, said clamping member having a pocket for receiving said lug, and an adjustable abutment member engaging said lug for moving the lug-carrying attaching member relative to the element-connected attaching member.

27. In a motor vehicle having a road wheel disposed at one side thereof, an oscillatory element connected to said wheel for oscillatory movement in response to rising and falling movement of the wheel independently of the remaining wheels of the vehicle, a torsionally elastic unit for mounting said oscillatory element on the vehicle, said unit comprising a pair of concentric annular bodies, the inner body being of greater length than the outer body, a cylindrical sleeve between said bodies and bonded thereto, a pair of cylindrical sleeves respectively bonded to the outer surface of the outer body and to the inner surface of the inner body, and means for connecting said pair of sleeves respectively to the vehicle and to said oscillatory element.

28. In a motor vehicle having a frame structure and a pair of road wheels disposed at opposite sides thereof, a pair of oscillatory elements respectively connected to said wheels, means for mounting said elements for oscillation about a common axis, a body of resilient non-metallic material having relatively movable surface portions thereof respectively adapted for operative connection to said elements, and a pair of operating connecting members each having a portion thereof bonded to one of said body surface portions, said members having other portions thereof extending in opposite directions relative to each other for fixed operative connection with said elements respectively.

HARRY T. WOOLSON.
ALEXANDER G. HERRESHOFF.
HAROLD A. HICKS.
GLENN H. PARKER.
RAYMOND A. WYATT.